April 6, 1965   H. E. LEFLON   3,176,358
FASTENERS FOR CONVEYOR BELTS AND THE LIKE
Filed March 28, 1963   3 Sheets-Sheet 1
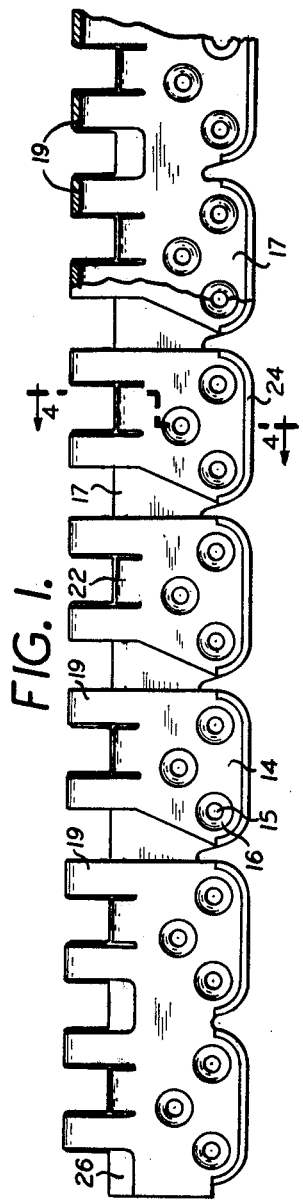
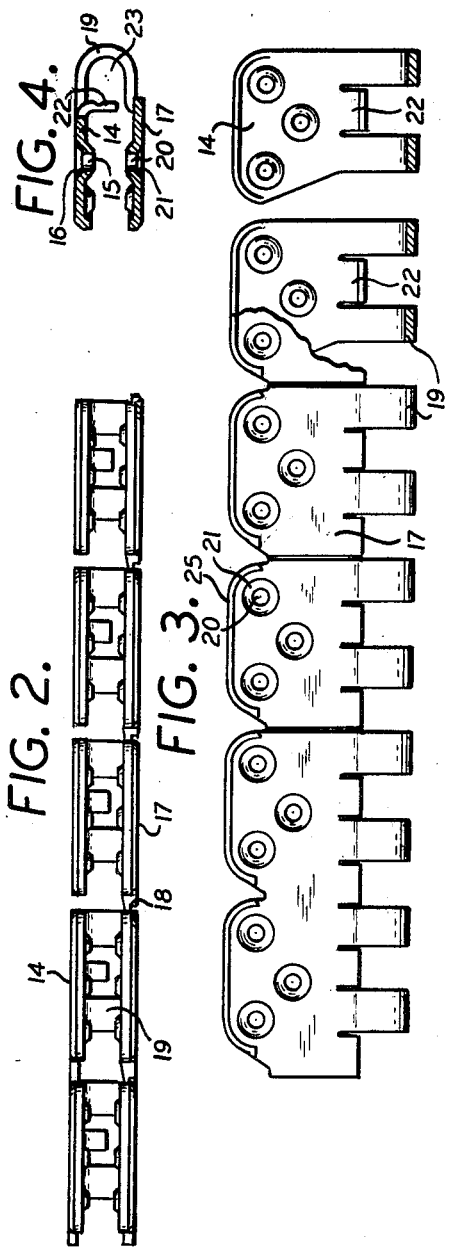
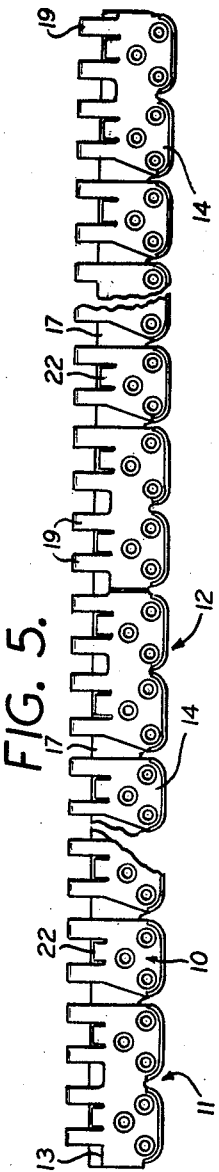
INVENTOR
HENRI EUGENE LEFLON
BY
ATTORNEY.

April 6, 1965      H. E. LEFLON      3,176,358
FASTENERS FOR CONVEYOR BELTS AND THE LIKE
Filed March 28, 1963      3 Sheets-Sheet 2
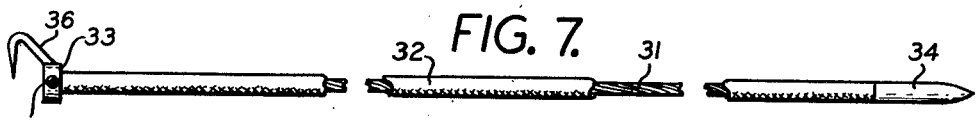
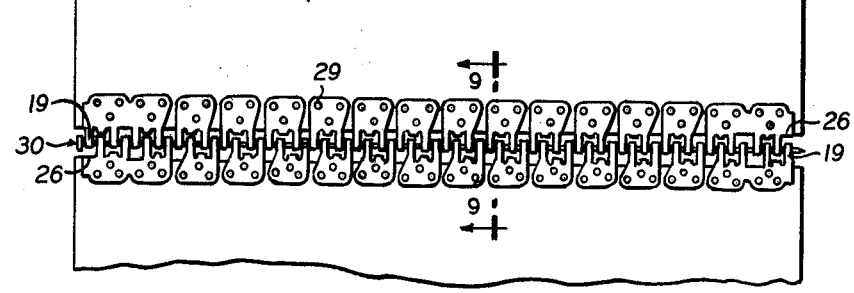
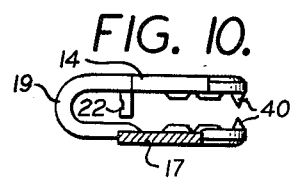
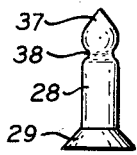
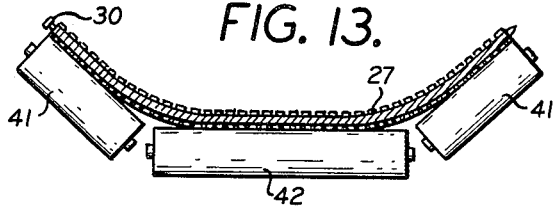
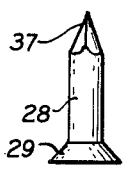
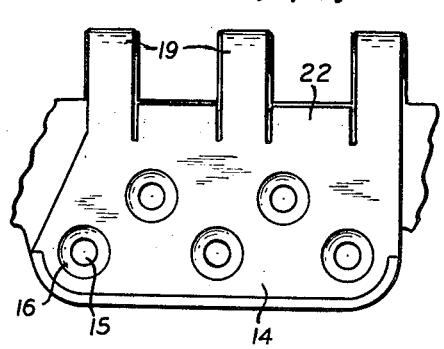
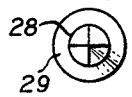
INVENTOR
HENRI EUGENE LEFLON
BY
ATTORNEY.

April 6, 1965   H. E. LEFLON   3,176,358
FASTENERS FOR CONVEYOR BELTS AND THE LIKE
Filed March 28, 1963   3 Sheets-Sheet 3

INVENTOR
HENRI EUGENE LEFLON
BY
ATTORNEY.

United States Patent Office 3,176,358
Patented Apr. 6, 1965

3,176,358
FASTENERS FOR CONVEYOR BELTS
AND THE LIKE
Henry Eugene Leflon, 85 Rue Vauban, Lyon, France
Filed Mar. 28, 1963, Ser. No. 268,726
Claims priority, application Mexico, July 18, 1962,
68,282
10 Claims. (Cl. 24—33)

The present invention relates to fasteners for conveyor belts and the like and for connecting the ends of a conveyor belt and, more specifically, to a fastener which is capable of bending and conforming to the profile of the conveyor which may be curved.

The fasteners for belts, which are known, as disclosed in applicant's prior Patents No. 2,896,282, No. 2,971,256 and No. 3,010,168, comprise a plurality of U-shaped members with prongs at their ends, which prongs are inserted into the belt on both sides thereof. They are then arranged with the end curves of the U-shaped members such that a cable of steel or other suitable material is inserted between them by means of which the fasteners of a section of the belt are connected with those of another section of the belt. This known method has the disadvantage that the prongs of the U-shaped members are very sharp and, as a rule, cause a damage to the belt. Moreover, they are not able to be used in curved sections or troughs in the conveyors, unless a very large number of these fasteners are separated and connected individually by means of individual link-pins.

Fasteners have also been used which are made of sheet metal and formed as a number of hinges comprising a U-shaped member and a complementary space to receive that portion of the U-shaped members of the hinge which is disposed oppositely thereof. This arrangement has, however, the great disadvantage that the hinges do not remain in line in view of the fact that the force exerted upon them by the link-pin does not coincide with the central axis of the hinge. Furthermore, the end hinges exert a separate force in a direction transverse to the axis of the link-pin, so that it tends to bend in the direction of the last hinge of the fastener.

This type of hinge or fastener for belts is formed by a plurality of butt-hinges, separate from each other and fixed by means of bolts and screws to the ends of the belt. By means of these hinges, sections of the belt are joined which can have a curved shape, for example, such as that used for conveying bulk material, forming a conveyor-trough into which any material is lodged without danger of spilling. This device also has the disadvantage in that the hinges or fasteners are separated and consequently require a guide for their installation. Furthermore, they are easily displaced and, what is worse, are difficult to replace.

It is, therefore, one object of the present invention, to provide fasteners for joining the ends of conveyor belts which can conform readily to the shape of the conveyor and which can be made integrally as a single piece which is afterwards broken into individual sections to take the shape of the "troughs."

It is another object of the present invention to provide fasteners for conveyor belts which also have means capable of joining two of the fasteners, each one fixed to a section of the belt by means of one single link-pin having the form of a flexible cable which, in turn, conforms to the shape of the trough of the belt, and which either straightens out or curves further, depending on the requirements of the operation.

It is still a more specific object of the present invention to provide fasteners to be fixed to the end of a length of a belt, which fasteners comprise a plurality of separate sections, each of which has two U-shaped members, so as to effect a perfect connection of the length of the belt by means of a flexible link-pin and to support properly the ends of the link-pin and prevent the latter from bending.

It is another object of the present invention to provide fasteners for conveyor belts which, in their U-shaped portion or housing for the link-pin have adequate means, so that when the fastener is pressed down to grip the transverse section of the belt and is secured to the edge of the same, it prevents the closing of the link-pin housing which would make its later insertion impossible.

It is a still further object of the present invention to provide fasteners for conveyor belts which through their actual construction prevent a bite of the ends of the fasteners towards the inside of the belt-structure, which bite would afterwards prevent the easy extraction of the fasteners by means of a suitable tool.

It is also still another object of the present invention, to provide a fastener for conveyor belts which also is connected to the ends or edges of the belt by means of pins with threads or suitable rivets and which has seats for the rivets which prevent any jumping on the corresponding portion of the fastener because of a projecting rivet.

With these and other objects in view which will become apparent in the following detailed description, the present invention will be clearly understood in connection with the accompanying drawings, in which:

FIGURE 1 is a top plan view of a strip of a fastener designed according to the present invention;

FIG. 2 is a front elevation of the fastener shown in FIG. 1, indicating the inside structure;

FIG. 3 is a bottom plan view of the fastener disclosed in FIG. 1;

FIG. 4 is a section taken along the lines 4—4 of FIG. 1;

FIG. 5 is a top plan view of a complete section of a fastener partially broken away, indicating clearly the manner in which the strips of the fasteners are manufactured for later cutting into individual sections;

FIG. 6 is a plan view, partly in section, of a flexible link-pin used in conjunction with the fastener;

FIG. 7 is a plan view of another embodiment of the flexible pin;

FIG. 8 is a top plan view of two ends of a conveyor belt, connected together by means of the fastener designed according to the present invention, shown completely secured to the ends of the belt and with the link-pin inserted through its hinges;

FIG. 9 is a section, along the lines 9—9 of FIG. 8;

FIG. 10 is an end view of a clamp according to the present invention;

FIG. 11 is an elevation of one embodiment of a rivet which can be used for connecting the belt with the clamp of the present invention;

FIG. 12 is an elevation, and FIG. 12a is a bottom plan view of another embodiment of a rivet with squared or pyramid points;

FIG. 13 is a cross-section of a conveyor belt in the form of a trough, suitable for conveying bulk material, in which the belt is shown in form of a trough and the various sections of the clamp according to the present invention are arranged along the same with the flexible link-pin inserted through its U-shaped members;

FIG. 14 is a top plan view of one embodiment of the clamp according to the present invention, in which the individual hinges comprise three U-shaped members and three spaces instead of two.

Figure 15:
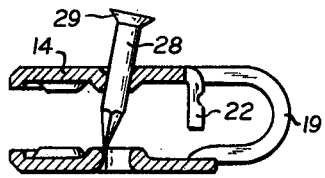
FIG. 15 is a part section of one of the hinges of the clamp according to the present invention, similar to that shown in FIG. 4, with an improved arrangement of the holes for passing the rivet, and a rivet being inserted therein and prior to being riveted.

Referring now to the drawings, a fastener for conveyor belts is disclosed which shows three different types of hinges all of which form an integral and suitable assembly for use in combination with a flexible type link-pin as will be more clearly described below.

The three types of hinges used in the clamp according to the present invention are illustrated in FIG. 5 of the drawings and are a hinge 11 with four U-shaped members leaving a space 13 for inserting into the U-shaped members of the hinge oppositely disposed relative to each other at the juncture of the belt. Another simple type of hings 10, also disclosed in FIG. 5, which hinge 10 has two U-shaped members and a third type of the hinge 12 is disclosed, also double, but designed differently from the hinge 11, as can readily be seen in FIG. 5.

The fastener according to the present invention is usually arranged in such a manner, that on one of its sides is disposed a hinge 11 and on the opposite side is arranged a double hinge 12 with a plurality of individual hinges 10 arranged between both ends.

The hinges, designed in accordance with the present invention, comprise a portion of a plate 14 which is arranged at the front part of the fastener, that is the part of the fastener which is exposed and towards the top of the belt. The portion of the plate 14 has three orifices 15 with a bevel 16 suitable for receiving rivets therein, as will be described below, and a support portion 17, as shown in FIG. 3, has indentations 18 particularly provided for simplifying the cutting of the fastener into any desirable length and size. The parts 14 and 17 are connected by means of U-shaped members 19, as can be clearly seen from FIG. 4 of the drawings.

The bottom part 17 of the fastener, as shown clearly in FIG. 3, is also provided with orifices 20 which correspond precisely and are aligned with the orifices 15 of the parts 14 of the fastener's top portion and which also have a bevel 21, adapted to receive a special rivet, which is used in conjunction with the present fastener to connect the edges of a conveyor belt.

The part of the U-shaped member 19 of the fastener hinges forms the housing for a link-pin which, in accordance with the present invention, is preferably flexible and a butt-end 22, which projects integrally at an angle of 90° relative to the top portion 14 of the fastener. The butt-end 22 has a suitable length, to permit attachment thereof to the belt, when the fastener is pressed to the belt. The housing 23, formed by the U-shaped member 19 and the butt-end 22, receiving the pin, is of a suitable size, so that the pin is not pressed down and thus it permits easy insertion in and removal from, respectively, the interior of the U-shaped member.

On its outside edges, both the top plates 14 and the bottom plates 17 of the fastener have beads 24 and 25, respectively, which serve to reinforce the structure of the plates and to avoid their bending towards the inside and biting the belt when they are attached to it, which biting would prevent an easy separation of the fastener, if desired, by use of a tool such as a screwdriver, a chisel or the like.

The hinges formed by two U-shaped members 19 are arranged generally at the center of the fastener, while at both ends of the latter are placed double hinges consisting of four U-shaped members 19, as can easily be determined from FIGS. 1, 2, 3 and 5 of the drawings. The double hinges 19, disposed at the left end of the fastener, as shown in FIG. 8, are formed in such a manner that they define an entrance-orifice 26, in which the U-shaped member 19 of the fastener is inserted, which fastener is connected to the edge of the other section of the belt, as shown clearly in FIG. 8. This means that, in relation to FIG. 5, a complete section of the fastener to be attached to a belt, has a double hinge at each side which has two variations, namely, the one arranged at the left of the hinge has an entrance orifice 26 to receive an additional end U-shaped member 19 and the double hinge which is located at the opposite or right end of the belt, has a U-shaped member 19 at its end portion, without providing a similar entrance opening. In this way, the fasteners are complementary relative to each other, in such a manner, that if they are set one in front of the other with their U-shaped members contiguous, the arrangement shown in FIG. 8 is obtained so that there will always be an end entrance orifice 26, in front of an end U-shaped member 19, on both sides of the belt 27.

For use with a flat belt 27, the fastener, according to the present invention, does not need to be divided into sections unless greater or lesser lengths thereof are required. If, however, a length of a fastener, other than the usual length normally manufactured, is required, such specific length is obtained merely by cutting the fastener at a predetermined point and attaching another length thereof suitable for forming the complete fastener which, at each of the ends, must have a double hinge, as set forth above.

All hinges are connected together and are riveted to the edge of the belt 27, as is apparent from FIGS. 8 and 9, by means of rivets 28 with flush heads 29 and, in which the riveted end, a new head is formed, which leaves the surface flush with the outer surface of the fastener, as shown clearly in FIG. 9. The arrangement of the fasteners, once assembled, can be clearly determined from FIG. 8, where its link-pin or cable 30 is shown as transversing all U-shaped members 19, which serve as housing on both fastener sections, which are attached to the respective opposite belt edges.

FIG. 9 discloses the manner in which the fastener is attached to a belt 27 and also the manner in which one section of the fastener is attached to the other section of the fastener, to be secured to the other edge of the belt. As can be seen clearly in FIG. 9, the fastener is pressed down by means of the rivet 28 until it is completely set on the belt 27 with the rivet 28 having both heads 29 riveted which are flush with the outer surface of the plates 14 and 17 of the fastener. Because the belt 27 has usually a lesser thickness than the open end of the fastener, the latter must be pressed down or hammered down in such a manner that the U-shaped member 19 tends to close and to leave a housing, the diameter of which is smaller than that of the flexible cable 30. The butt 22 provided on each of the fastener sections, as is clearly shown in FIG. 9, prevents closing of this housing, leaving a sufficiently large space therein to receive the cable 30.

The butt or shank 22, which serves to prevent the curved portion of the U-shaped member 19 from closing and preventing subsequent entrance of the cable 30, may be a little longer than is shown in FIG. 4. The butt 22 may also have a width equaling with the width of the space provided between a pair of adjacent U-shaped members of the fastener. During the hammering, the butt 22 will be prevented from folding, thereby impairing its action for preventing the fastener from closing to an extent that the flexible cable could not be inserted into the fastener.

The cable used in connection with the present invention may have various characteristics, two embodiments thereof are disclosed in FIGS. 6 and 7 of the drawings. These embodiments differ also from the cable shown in FIG. 8. The member 30 comprises, in general, a taut steel cable 31 which is covered at its outer portion by means of a plastic sheath 32 and has a head 33 at one of its ends and, at the other end, a point 34 suitable for introduction through all the spaces left in the fastener by their U-shaped members 19, so as to connect the two sections of the fastener and form the complete hinge. The head 33 may be of a configuration, as shown in FIG. 7, with or without the hook 36 shown in FIG. 7. This head 33 has a set screw 34' which engages the cable 31, and the point 34 is usually clamped over the cable 31, so as to attach it firmly.

In another embodiment of the cable, its head 33 has a stem 35 which operates as clamping means for the cable 31, in a similar manner to that of the point 34.

On the other hand, in the embodiment shown in FIG. 7, there is a hook 36 secured to the head 34, which hook 36 is sufficiently flexible to be bent backwards and to be attached to the belt by which means any possibility, that the cable leaves inadvertently, is avoided. However, this hook is not absolutely necessary, in view of the fact that the same tension to which the belt is subjected, acts as additional means for preventing that the cable moves out of the fastener.

The portion 35 or the head 34 or both portions of the cable shown in FIG. 6 or 7, may have a length equal to the width of the last section of the fastener as, in this part the fastener cannot bend in any way, since it is a single integral member and its rigidity is thus reinforced by means of the metal part 35 or 34 of cable.

In this manner, both end sections of a fastener used for a belt are heavily reinforced and it is practically impossible for them to bend through rough handling of the belt to which they are attached.

The connection of the fastener with the edges of the belt may be effected by means of various types of rivets and two embodiments are shown in FIGS. 11 and 12 of the drawings. FIG. 11 discloses one embodiment of the rivet 28, which has a flat head 29 and a point 37 at its opposite end, separated by a neck portion 38, which may be formed easily by means of a tool and afterwards the pointed end 37 can be riveted to form an opposite head similar to the head 29.

All the rivets terminate orginally with a point, in order to separate the cords of the belt without breaking them and once they have passed the belt and one of the faces of the fastener, the point is cut off and the actual riveting is effected, so that the belt can be securely attached to the fastener. The points of the rivets can be round or circular as shown in FIG. 11, or they may be of a pyramid or of square cross-section, as shown in FIGS. 12 and 12a. The latter configuration is capable of providing sharper rivets, which separate the cords or fibers of the belt more effectively, and do not damage it in the slightest degree.

The fastener designed in accordance with the present invention, as has been set forth above, will work with rivets inserted into the orifices of the plates 14 and 17, but these rivets cannot be of standard shape, since the latter have a round head, and the flat lower portion thereof is beyond the level of the faces of the hinges. In order that the rivet, on being rivetted may not break off its head, in accordance with the present invention, a rivet 28 is provided which, as shown in FIGS. 11, 12, 12a and 14, has a head 29 integral with the body 28, and the latter is conical or beveled, so that when the rivet is inserted into the orifices 15 of the plates 14 of the hinges, the head 29 is completely supported on the beveled portion of the orifices 15 and, thus, has a considerably increased strength, forming, for practical purposes an integral part of the said hinge.

The rivets which are used to secure the fastener, according to the present invention, located at the end of a belt, may have a head which is flat on the outside or this part may be slightly domed, thereby meeting in every way the purposes for which it is designed.

Furthermore, the fastener, according to the present invention, can be attached to the ends of the belt, not only by means of the rivets shown, as will be obvious to the man skilled in the art, but also may be attached to the belt ends with which they are associated, by means of special clamps introduced mechanically or by hand, or by means of pins with threads, provided these additional attaching elements do not constitute an unbearable obstruction to the belt to pass around the pulleys about which the belt moves.

The hinges of the fastener of the present invention can assume a configuration different from that shown in FIG. 10. The difference resides merely in the arrangement of added points 40 on the plates 14 and 17, both, at the upper as well as at the lower inner face, so as to effect a stronger attachment between the fastener and the belt.

Another variation of the fastener hinges, according to the present invention, is shown in FIG. 14. In this case, each of the hinges has three U-shaped members and leaves between the lateral ends of each fastener unit three corresponding spaces to receive the U-shaped members of the fastener section which is attached to the opposite section of the belt. In the latter case, the fastener is also constructed in long pieces or strips, but all the hinges are of the same dimension and are either joined by welding or are made as one integral piece, with intermediate grooves to facilitate their subsequent separation by breaking. The complete strip or fastener, once attached to the belt, or prior to its attachment, may be broken at points suitable for providing separate and individual hinges, in order to provide the necessary conditions for the fastener to follow the transverse contour of the conveyor belt to which it is attached.

As is readily seen from FIG. 14, this type of the clamp according to the present invention also has hinges which are complementary, namely hinges at the left end have a U-shaped member at their left while the hinge at the right end has a housing at the same position, so that two fastener sections directly opposite each other can be coupled with the U-shaped member of one entering into the open intermediate space of the others and they are arranged to receive the cable or link pin.

To utilize this fastener on a conveyor of the trough type, as shown in cross-section in FIG. 13, the conveyor is formed of a plurality of rollers 41 one at each end, their longitudinal axes being inclined at an angle relative to the horizontal and of a central roller 42. Then the fastener, according to the present invention, breaks strip by strip, once attached to the belt, or prior to such attachment, so that there is a continuous fastener through which the link-pin or cable 30 may be inserted, as is evident from FIG. 13, the belt then taking the shape of the trough of the belt. It can straighten out or curve in some other way on the return span, without any disturbance of the fasttener, since it is formed by a large number of separate strips or individual hinges, through which the flexible pin or cable runs and which may also be shaped in any way desired.

This is an additional advantage of the structure of the present invention over the previous structures, wherein the fasteners had to be formed by individual members thus forming a multiple structure, which was likely to break down from time to time. With the fastener, according to the present invention, a single pin or cable is used, which passes through all the cut sections of the fastener, thus forming an individual fastener, so to speak, which accommodates itself to the shape of the desired trough in conveyors for bulk material.

In the fastener according to the present invention, as shown in FIGS. 1 to 14, the orifices 15 and 20 on the plates 14 and 17 have a cylindrical lateral wall. Although this type of orifice is suitable for all practical purposes, it has often been found that when a rivet is inserted through one of the orifices 15 and afterwards through the belt, the second of the orifices is out of alignment with the rivet point. This is due to the fact that the area of the orifice 15 is equal over the whole width of each of the plates 14 and 17. It is, therefore, another development of the present invention, to provide orifices 15 and 20 for the plates 14 and 17, respectively, which have a conical or beveled wall, so that they have the shape of funnels with their end portions flaring outwardly. This arrangement facilitates the insertion of the point of the rivet, when the rivet enters the inside orifice of the fastener towards the outside, as is shown in FIG. 15. In this way, the conical surface of the orifice directed to the inside of the fastener, acts as a guide for the rivet tip or point, making it more difficult for the second orifice to be missed, when the tip or point of the rivet falls slightly to the outside of its circular opening in the cylindrical wall.

Although in the preferred embodiment of the present invention, rivets are used for fixing the fastener to the ends of a belt, it will be understood that this embodiment is not of a limiting nature for the scope of the present invention, in view of the fact, as was indicated previously, rivets of the ordinary type, with round heads, pins and screws or clamps in the form of U-shaped members can also be used, in which case each of the tips or points of the clamps will pass through one of the orifices of the belt clamp of the present invention.

In relation to the arrangement of the hinge shown in FIG. 4, there was great attention paid to the possibility that the fasteners according to the present invention, on receiving a blow to attach them completely tight to the end of a belt, would close up excessively, preventing the subsequent entry of the flexible link-pin or cable. This closing was remedied by providing the butt 22, which prevents the curved end 19 from closing beyond a predetermined degree, which will thus be sufficiently wide to permit entrance of a pin or cable.

Figure 16:
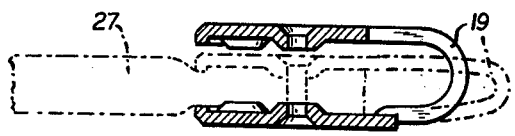
FIG. 16 is a part section of one of the hinges according to the present invention showing, in solid lines, its position before being closed and, in dotted lines, the position it assumes after being hammered down for attachment with the belt.

The problem, previously described, is aggravated further when the fasteners are to be used in combination with belts, the thickness of which is less than that of the open end of the hinge itself. In the latter case, when the hinge is hammered to adjust to the thickness of the belt, the situation is clearly illustrated by the dotted lines in FIG. 16. The curved portion 19 of the fork, after the latter has been hammered down to adjust to the belt, is completely flattened in such a manner that it forms an acute angle and not a rounded curve which permits passage of the pin therethrough.

Figure 17:
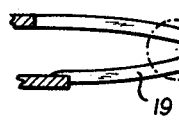
FIG. 17 is a diagrammatic showing to indicate the impossibility of inserting the flexible link-pin of the present invention through the closed hinge, when the belt thickness is less than it should be.

In FIG. 17, it is shown clearly that it would be impossible to introduce the pin after the fastener has been hammered down onto a belt of less thickness than that of its own opening.

Figure 18:
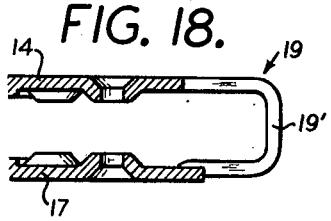
FIG. 18 is a diagrammatic showing, partly in section, of the hinge according to the present invention, disclosing a preferred embodiment of the curved U-portion which is a flat base.
Figure 19:
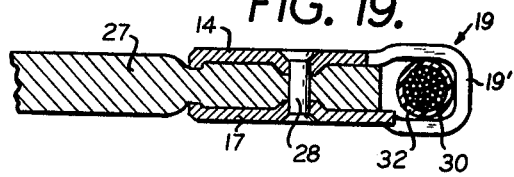
FIG. 19 is a view similar to that of FIG. 18 showing a hinge after it has been closed, when the belt is of the same thickness as the opening of the hinge itself and also indicating the position of the link-pin connecting the hinges.

To remedy the foregoing situation, with or without use of a butt 22, in the curved portion 19 of the clamp, an entirely flat portion 19' may be provided (FIG. 18), whereby when the hinge is hammered to fasten it to the belt of lesser thickness, as shown in FIG. 19, the flat portion 19' prevents the loop 19 from forming an acute angle and thus provides a housing which is quite adequate for the insertion of the cable 30 when the ends of the belt 27 are secured tightly to the hinge.

Figure 20:
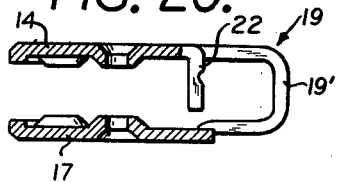
FIG. 20 is a section of the hinge according to the present invention, similar to the showing in FIG. 4, indicating a modification of the reinforcing shank in combination with the plane portion of the curved part of the fork.

Furthermore, the hinge according to the present invention can provide both expedients, which prevent the closing into an acute angle of the curved portion 19, as shown in FIG. 20, providing in the same hinge, the straight portion 19' of the loop 19 and, furthermore, the butt 22 which, as already mentioned, can be made sufficiently wide and long to prevent the loop 19 from closing too much.

Figure 22:
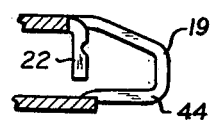
FIG. 22 is a fragmentary section of one of the hinges shown in FIG. 21 indicating the modification therein.
Figure 21:
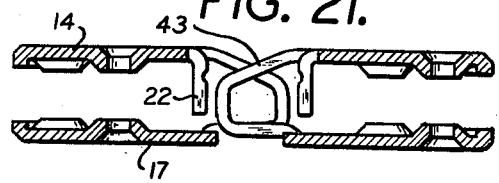
FIG. 21 is a section of a pair of hinges just prior to the insertion of the link-pin and disclosing a slight modification of the present invention, by means of which absolute coverage of the surface engaged by the hinges is obtained by inserting the end of one of the hinges into the other of the hinges.

In FIGS. 21 and 22 is shown still another embodiment of the hinge, according to the present invention, by means of which any open space through which material conveyed by the belt might fall, at the place where the hinge is located, is avoided. To avoid any loss of material conveyed by the belt, the U-shaped member of one of the hinges is inserted towards the inside of the flat portion opposite the second hinge, as is shown clearly in FIG. 21, by providing an inclined part 43, with sufficient slant so that the hinge may enter towards the inside of the flat plate 17 of the opposite hinge. In this particular case, it will be necessary to use a cable having a reduced diameter, so that the cable may be inserted into the end of the U-shaped member.

In other words, in this embodiment of the present invention, the portion of the plate 17 of the hinge is projected towards the end thereof and the portion of the U-shaped member is provided with the inclined part 43, so that the latter can be inserted below the flat plate 17, so as to provide, in this manner, a union between the two hinges, which is perfectly sealed relative to the material conveyed on the belt.

The inclined portion 43 which is used to prevent powdered materials from passing through the spaces left between the hinges of a fastener, may be combined with the flat portion 19', as is shown in FIG. 22, so as to provide a hinge which, while supplying the improved structure to avoid leaking of the pulverized material through the hinge, will also provide a structure which prevents the excessive closing of the hinge, which impedes the subsequent insertion of the pin, especially in cases where the belt is of lesser thickness than the opening at the free end of the hinge.

However, to make this combination feasible, there will be provided in each bend of the metal sheet forming the hinge, a portion with slight radius 44, so as to avoid right angled bends which naturally crack the material at the outer part. By providing these portions with smaller curvature radius, the cracking of material will be avoided and also a reduction of its mechanical strength is not impaired.

Figure 23:
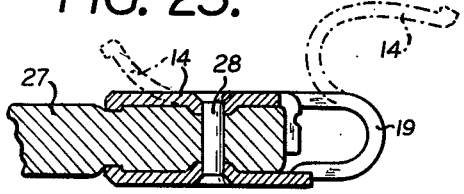
FIG. 23 is a section of a hinge illustrating in dotted lines a raised portion, raising it off the belt surface upon being caught by any obstacle.

Another problem which usually presents itself with the standard fasteners is the fact, that if the fastener runs into a rigid member or any other sufficiently unyielding material, to prevent the belt from continuing the conveying operation, such material or rigid member may catch the plate of the belt and bend it over, as shown in the dotted lines in FIG. 23.

To avoid such occurrences, up to now hinges have been provided for fasteners with beveled portions at their ends, so that they may slide over the rigid members thus avoiding any bending of the plates of the fastener.

Figure 24:
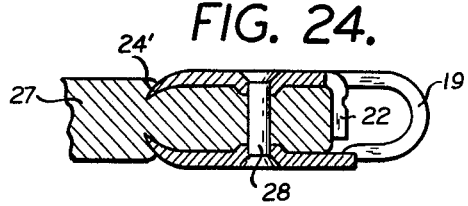
FIG. 24 is a cross-section of a hinge according to the present invention, having both its upper and lower flap bent inwardly, so that the ends of the hinge are embedded at its end points inside the belt, thereby preventing any rigid member from catching and twisting it.

However, it has been found that the above expedient is quite inadequate for avoiding the accidental bending of the plates. It is for this reason, that a hinge has been provided, as shown clearly in FIGS. 24 and 25 of the drawings, wherein the portions at the extreme edges of the plates 14 and 17 are provided with folds 24' which are directed towards each other and which, when the fastener is hammered down on the end of the belt 27, are pushed into the body of the belt 27, thus avoiding the existence of any tips (points) which might be caught by rigid members or the like.

Figure 25:
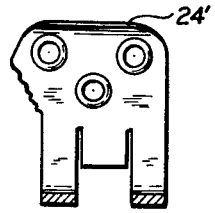
FIG. 25 is a fragmentary top plan view of a hinge, in section.

The folding towards the interior of the clamp, according to the present invention, is provided all along the front edge of the plates 14 and 17, as is clearly shown in FIG. 25, so that the front end is practically sunk into the body of the belt in association of which the fastener is being utilized and by which all accidental foldbacks of the same, by catching of heavy materials or rigid members with which they may collide, are avoided.

While I have disclosed several embodiments of the present invention, it is to be understood that these embodiments are given by example only and not in a limiting sense, the scope of the present invention being determined by the objects and the claims.

I claim:
1. A hinge fastener for conveyor belts and the like comprising
 two U-shaped members adapted to be respectively clamped on the belt ends to be connected with each other,
 each of said U-shaped members comprising an upper plate and a lower plate,
 said upper plate and said lower plate being adapted to engage the respective opposite faces of the ends of said belt,
 said upper plate and said lower plate being substantially parallel relative to each other and being connected by at least two U-shaped portions integral with said upper plate and said lower plate, respectively, and defining a free space between said U-shaped portions,
 each of said U-shaped portions forming a housing,
 said U-shaped portion of one of said U-shaped members entering said free space of the other of said U-shaped members,
 each of said U-shaped members having the same number of U-shaped portions and the same number of free spaces as that of the opposite and complementary of said U-shaped members, and said U-shaped members being exchangeable,
 a hinge pin passing through said housing of said respective U-shaped members to pivotally connect one of said U-shaped members with the other of said U-shaped members,
 said U-shaped members including integral means preventing the closing of said U-shaped members in order to assume a diameter of said housing slightly larger than the diameter of said hinge pin,
 said upper plate and said lower plate having a plurality of orifices aligned between said upper plate and said lower plate,
 a rivet received in each of said orifices of said upper plate and in the corresponding aligned orifice of said lower plate and adapted to extend through said belt for connection of said upper and lower plates with said belt,
 each of said rivets having a head received in said upper and lower plates and flush with the outer faces of said upper and lower plates,
 said hinge pin comprising a steel cable,
 one end of said steel cable being pointed for easy insertion of said steel cable through said housings,
 the other end of said steel cable having an enlarged head portion adapted to operate as abutment means during the insertion of said steel cable through said housings,
 and one of said U-shaped portions having an inclined part projecting from said upper plate, permitting the insertion of one of said U-shaped members relative to the opposite of said U-shaped members from beneath, whereby no open space remains upon connection of the corresponding U-shaped members and any escape of the conveyed material is prevented.

2. The hinge fastener, as set forth in claim 1, which includes
 a plurality of said U-shaped members disposed adjacent each other and clamped to each end of said belt, in order to cover the entire width of said belt,
 each of said upper plates and each of said lower plates of said U-shaped members disposed at both ends of said fastener have four U-shaped portions defining four free spaces between the lateral ends of said U-shaped portions,
 said upper plate and said lower plate of said U-shaped member disposed at one end of said fastener having at the outermost end a free space to receive a corresponding U-shaped portion of the opposite U-shaped member,
 said upper plate and said lower plate of said U-shaped member disposed at the other end of said fastener having at the outermost end a U-shaped portion to enter a corresponding free space of the opposite U-shaped member, and
 a plurality of said U-shaped members having each two of said U-shaped portions disposed individually between said end U-shaped members,
 in order to permit said belt to assume a trough shape and said fastener being adjustable to said shape.

3. The hinge fastener, as set forth in claim 1, wherein said means preventing closing of said U-shaped members comprises a butt member projecting substantially perpendicularly inwardly from one of said plates and having a length sufficient to prevent the closing of said U-shaped portion beyond a predetermined limit.

4. The hinge fastener, as set forth in claim 3, wherein said butt member has a width substantially equal with the width of said free space between said U-shaped portions.

5. The hinge fastener, as set forth in claim 1, wherein said upper plate and said lower plate have a bead formation in their marginal zones in order to prevent biting of said plates into said belt and also to permit removal of said fastener.

6. The hinge fastener, as set forth in claim 1, wherein said enlarged head portion of said steel cable has a flexible hook member secured thereto,
 said hook member being adapted to be inserted into said belt, in order to prevent an inadvertent removal of said steel cable.

7. The hinge fastener, as set forth in claim 1, wherein said steel cable has at its pointed end a rigid metal member of a length equal with that of said U-shaped member disposed at the end of said fastener.

8. The hinge fastener, as set forth in claim 1, wherein each of said U-shaped members has three U-shaped portions and three free spaces between the lateral ends thereof.

9. The hinge fastener, as set forth in claim 1, wherein said orifices in said plates include guide faces for insertion of said rivet into said orifice of one of said plates to lead to the opposite orifice of the other of said plates.

10. The hinge fastener, as set forth in claim 1, wherein said plates have their free ends bent inwardly towards each other, and
 said inwardly bent ends are adapted to bite into the opposite face of said belt, in order to avoid an outward bending of said plates upon engaging a rigid obstacle.

References Cited by the Examiner

UNITED STATES PATENTS

| | | | |
|---|---|---|---|
| 399,962 | 3/89 | Avery | 24—33 |
| 834,273 | 10/06 | Denney | 24—31 |
| 1,075,078 | 10/13 | Wilkinson | 24—33 |
| 1,476,084 | 12/23 | Kiefer | 24—33 |
| 2,165,020 | 7/39 | Welsh | 24—33 |
| 2,176,735 | 10/39 | Freedlander et al. | 24—33 |
| 2,222,381 | 11/40 | Tennefos | 24—33 |
| 2,355,580 | 8/44 | Wing | 85—37 |
| 2,629,909 | 3/53 | Hall | 24—33 |
| 2,675,592 | 4/54 | Lofton | 24—33 |
| 2,935,774 | 5/60 | Schick | 24—33 |
| 2,971,256 | 2/61 | Leflon | 24—33 |

DONLEY J. STOCKING, *Primary Examiner.*

BOBBY R. GAY, *Examiner.*